US008814677B2

(12) United States Patent
Grills et al.

(10) Patent No.: US 8,814,677 B2
(45) Date of Patent: Aug. 26, 2014

(54) USING REAL-TIME CONSTRUCTIVE SOLID GEOMETRY TO PROVIDE PAINTING AND THINNING GAME MECHANICS

(75) Inventors: Jeffrey N. Grills, Austin, TX (US); Peter J. Shelus, III, Austin, TX (US); Bruce F. Naylor, Austin, TX (US); Matt Baer, Austin, TX (US)

(73) Assignee: Disney Enterprises, Inc., Burbank, CA (US)

( * ) Notice: Subject to any disclaimer, the term of this patent is extended or adjusted under 35 U.S.C. 154(b) by 496 days.

(21) Appl. No.: 12/874,933

(22) Filed: Sep. 2, 2010

(65) Prior Publication Data
US 2012/0058820 A1 Mar. 8, 2012

(51) Int. Cl.
*A63F 13/52* (2014.01)
*A63F 13/57* (2014.01)
*A63F 13/80* (2014.01)
*A63F 13/10* (2006.01)

(52) U.S. Cl.
CPC ........... *A63F 13/10* (2013.01); *A63F 2300/663* (2013.01); *A63F 2300/8094* (2013.01); *A63F 2300/64* (2013.01)
USPC .............. 463/31; 345/418; 345/419; 345/468

(58) Field of Classification Search
CPC ................. A63F 2300/663; A63F 2300/8094; G06T 9/40
USPC .............................. 463/31; 345/418, 419, 468
See application file for complete search history.

(56) References Cited

U.S. PATENT DOCUMENTS

| 5,274,718 A * | 12/1993 | Leonardi et al. ............... 382/240 |
| 6,088,035 A * | 7/2000 | Sudarsky et al. ............. 345/421 |
| 7,583,263 B2 * | 9/2009 | Huang et al. .................. 345/421 |
| 2005/0122323 A1 * | 6/2005 | Huang et al. .................. 345/421 |
| 2010/0016076 A1 * | 1/2010 | Longdale ........................ 463/32 |
| 2010/0016077 A1 * | 1/2010 | Longdale ........................ 463/37 |
| 2010/0029377 A1 * | 2/2010 | Canterbury et al. ............ 463/25 |

OTHER PUBLICATIONS

"Okami Walkthrough and Strategy Wiki SuperGuide" 1up.com (Jul. 20, 2008) (available at http://mycheats.1up.com/view/superguide/3134928/okami/ps2).*
"Epic Mickey First-Look Preview" 1up.com (Oct. 28, 2009) (available at http://www.1up.com/previews/epic-mickey-first-look-preview).*
Naylor, B.F., "Destructive Solid Geometry for Interactive Entertainment and Training" CSG 96 Set—Theoretic Solid Modeling Techniques and Applications at 85-99 (1996).*
"Okami Review" YouTube.com (Aug. 5, 2009) (available at http://www.youtube.com/watch?v=oVf2rMILU0M).*
Naylor et al., "Merging BSP Trees Yields Polyhedral Set Operations," Computer Graphics, Aug. 1990, vol. 24(4): pp. 115-124.

* cited by examiner

*Primary Examiner* — Bach Hoang
(74) *Attorney, Agent, or Firm* — Patterson & Sheridan LLP (57) ABSTRACT

Techniques are described for providing a painting and thinning mechanic within a computer-generated environment (e.g., in a video game). The painting and thinning mechanic allows geometry within the computer-generated environment to be "painted" or "thinned." Painting and thinning refers to a mechanic that involves making parts of the virtual environment visibly and collidably transparent (thinning) or visibly and collidably opaque (painting). The painting/thinning mechanic may be achieved using binary space partitioning (BSP) trees.

27 Claims, 5 Drawing Sheets

USING REAL-TIME CONSTRUCTIVE SOLID GEOMETRY TO PROVIDE PAINTING AND THINNING GAME MECHANICS

BACKGROUND

1. Field

Embodiments of the invention are directed to computer graphics. More specifically, embodiments of the invention use real-time constructive solid geometry, in particular a binary space partitioning tree (BSP), to provide painting and thinning game mechanics.

2. Description of the Related Art

In a computer gaming environment, generating images from a set of world and object geometry can be a complex task. A game engine needs to determine interactions between elements of geometry, compute physics for objects in the environment, respond to user input, compute actions for non-player characters, determine what elements are visible, among other things, all while rendering images at an acceptable frame-rate.

SUMMARY

Embodiments of the invention provide methods, systems and computer program products for using real-time constructive solid geometry to provide painting and thinning game mechanics. One embodiment described herein includes a method for executing a video game. The method may generally include receiving input indicating to apply a paint or thinner material to a first set of geometry in the video game and merging a first binary space partitioning (BSP) tree with a second BSP tree. The first BSP tree represents the first set of geometry. The second BSP tree represents a second set of geometry corresponding to the paint or thinner material. One more elements of geometry represented in the first BSP tree may be associated with a respective paint/thinning state. Further, the merged BSP tree represents a merged set of geometry created from the first and second sets of geometry. This method may also include updating, in the merged BSP tree, a paint/thinning state associated with a respective one or more elements of the merged set of geometry.

Another embodiment of the invention includes A computer-readable storage medium comprising a program product which, when executed, is configured to perform an operation for executing a video game. The operation itself may generally include receiving input indicating to apply a paint or thinner material to a first set of geometry in the video game and merging a first binary space partitioning (BSP) tree with a second BSP tree. The first BSP tree represents the first set of geometry. The second BSP tree represents a second set of geometry corresponding to the paint or thinner material. One more elements of geometry represented in the first BSP tree may be associated with a respective paint/thinning state. Further, the merged BSP tree represents a merged set of geometry created from the first and second sets of geometry. This operation may also include updating, in the merged BSP tree, a paint/thinning state associated with a respective one or more elements of the merged set of geometry.

Still another embodiment of the invention includes a system. The system may generally include a memory device storing an application program and a processor which, when executing the application program is configured to perform an operation. The operation itself may generally include receiving input indicating to apply a paint or thinner material to a first set of geometry in the video game and merging a first binary space partitioning (BSP) tree with a second BSP tree. The first BSP tree represents the first set of geometry. The second BSP tree represents a second set of geometry corresponding to the paint or thinner material. One more elements of geometry represented in the first BSP tree may be associated with a respective paint/thinning state. Further, the merged BSP tree represents a merged set of geometry created from the first and second sets of geometry. This operation may also include updating, in the merged BSP tree, a paint/thinning state associated with a respective one or more elements of the merged set of geometry.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Embodiments of the present invention are directed to techniques for providing a painting and thinning mechanic within a computer-generated environment. For purposes of illustration, embodiments of the present invention are described in the context of a video game; however, more generally the invention may be embodied in any computer simulation environment, such as professional flight training simulators, architectural design applications, etc. The painting and thinning mechanic allows geometry within the computer-generated environment to be "painted" or "thinned." More specifically, painting and thinning refers to a game mechanic that involves making parts of the game world visibly and collidably transparent (thinning) or visibly and collidably opaque (painting). Users may interact directly with the results of a painting or thinning operation, e.g., thinned sections of the world could be passed through, while painted sections could be hung on, landed on, traversed, etc. An in-game character could access units of a "painting" or "thinning" substance and throw, launch or otherwise release it into the computer-generated environment, resulting in the paint (or thinner) material intersecting with elements of the world geometry.

In one embodiment, this mechanic may be achieved using binary space partitioning (BSP) trees. As described in greater detail below, the intersection of paint or thinner with the world geometry may result in changes to a painted or thinned state associated with elements of that geometry. Specifically, changes to a painted or thinned state of faces (in two-dimensions) or volumes (in three dimensions) in geometry representing the gaming environment may be determined by merging a BSP tree representing the world geometry and a BSP tree representing the paint (or thinner) material. The particular change to a state of a given face (or volume) may be determined using an algebra describing the results of intersecting paint (or thinner) with an element of world geometry having a painted or thinned state.

Additionally, in one embodiment, the BSP trees generated to determine changes in the painting of thinned state of world geometry may be transformed into a collection of geometry (e.g., a collection of vertices) suitable for rendering by a graphics processing unit (GPU).

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
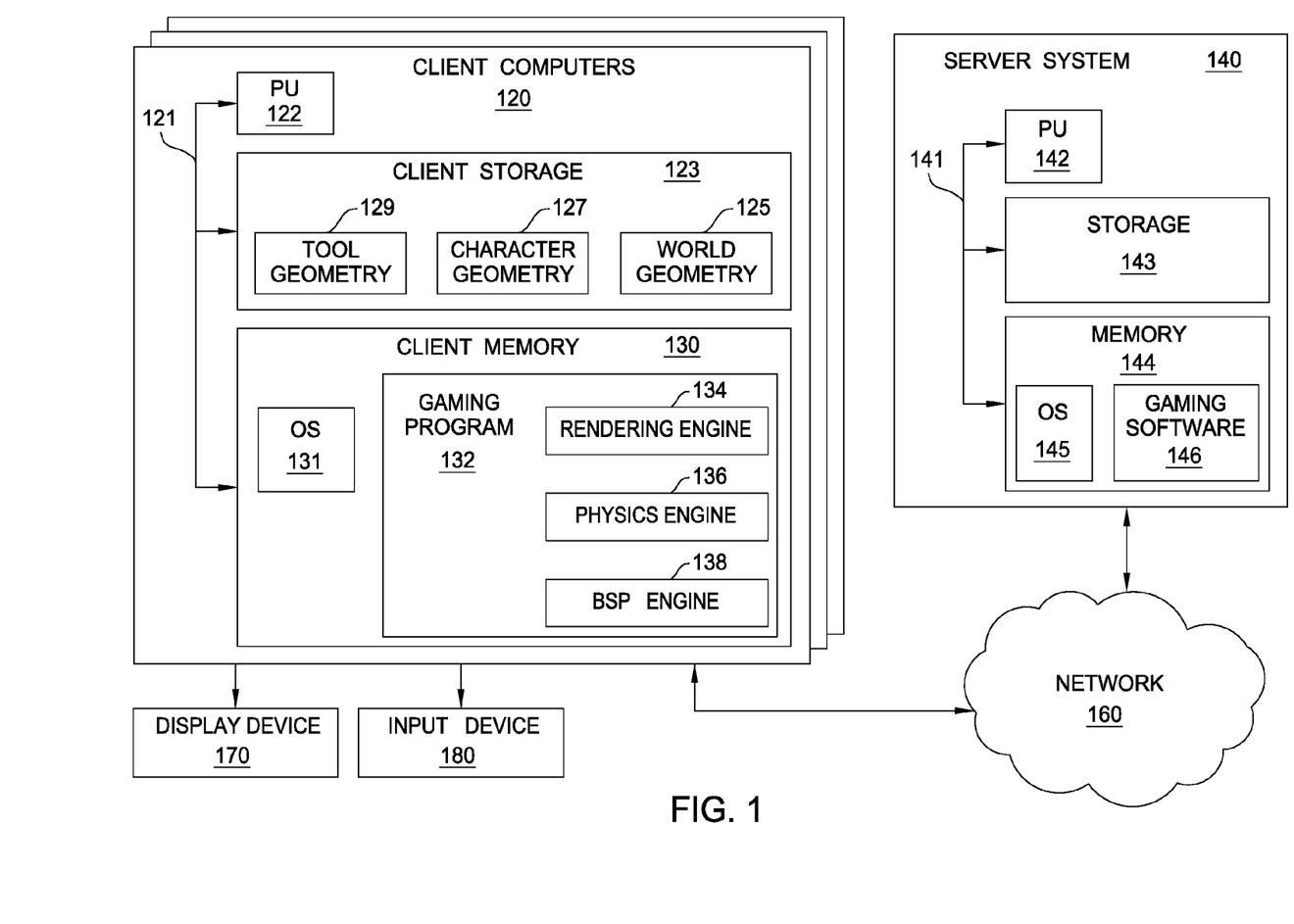
FIG. 1 illustrates an example computing system, according to an embodiment of the invention.

Referring now to FIG. 1, a block diagram illustrates a client-server view of a computing environment 100, according to one embodiment of the invention. As shown, computing environment 100 includes client computers 120, a network 160 and a server system 140. In one embodiment, the environment 100 may include existing computer systems, e.g., desktop computers, server computers, laptop computers, tablet computers, gaming platforms and the like. The computing environment 100 illustrated in FIG. 1, however, is merely an example of one computing environment. Embodiments of the present invention may be implemented on other computing platforms, regardless of whether the computer systems are dedicated video-game or home-media platforms, complex multi-user computing systems, such as a cluster of individual computers connected by a high-speed network, single-user workstations or network appliances lacking nonvolatile storage, etc. Further, while FIG. 1 illustrates a client-server model, other models are contemplated such as a peer-to-peer model.

As shown, each client computer 120 includes a processing unit 122, which obtains instructions and data via a bus 121 from a client memory 130 and client storage 123. Processing unit 122 is a programmable logic device that performs instruction, logic and mathematical processing, and may be representative of one or more CPUs and/or GPUs. Client storage 123 stores application programs and data for use by client computer 120.

The memory 130 is any memory sufficiently large to hold the necessary programs and data structures. Memory 130 could be one or a combination of memory devices, including Random Access Memory (e.g., DRAM modules), nonvolatile or backup memory (e.g., programmable or Flash memories, read-only memories, etc.).

Client storage 123 includes hard-disk drives, solid-state drives (SSD), flash memory devices, optical media and the like. As shown, client computer 120 is connected to the network 160. Client memory 130 includes an operating system (OS) 131 and a gaming program 132. Operating system 131 is the software used for managing the operation of the client computer 120. Examples of OS 131 include UNIX, versions of the Microsoft Windows® operating system, and distributions of the Linux® operating system. Video game platforms typically use an operating system developed for the particular set of hardware in a given platform. In one embodiment, each client computer 120 may be a dedicated gaming console, such as a Sony PS3®, Nintendo Wii® or Xbox 360®, capable of executing the gaming program 132. In another embodiment, each client is a general purpose computer configured to run any variety of gaming and non-gaming software.

As shown, client storage 123 stores a set of world geometry 125, character geometry 127 and tool geometry 129. The world geometry 125 provides a model of a virtual environment. That is, the world geometry 125 describes the shape and structure of each object within a virtual environment. As is known, geometry for computer-generated images is typically represented by a collection of vertices, which form polygonal faces. The vertices give an object a defined shape, and an appearance may be created by coloring each visible polygonal face. Similarly, the character geometry 127 describes the shape and structure of one or more player characters within a gaming environment. And tool geometry 129 corresponds to the geometry of a painting or thinning tool within the gaming environment. As discussed below, the intersection of paint or thinner tool geometry 129 with the world geometry 125 (or character geometry 127) may result in changes to a painted or thinned state associated with elements of that geometry.

The output of gaming program 132 may be viewed on a display device 170, such as an LCD, LED or CRT monitor display, and controlled using input devices 180 which may be, e.g., a keyboard, mouse and/or a controller. As shown, the gaming program 132 includes a rendering engine 134, a physics engine 136 and a binary space partitioning tree (BSP) engine 136. The rendering engine 134 is configured to take the world geometry 125, character geometry 127 and tool geometry 129 and render images sent to the display device 170 at a frame rate sufficient to give the appearance of continuous motion. The physics engine 136 is configured to simulate the behavior certain simple physical systems, such as rigid body dynamics (including collision detection), soft body dynamics and fluid dynamics for elements of the gaming environment. Thus, objects in the gaming environment may behave in a manner consistent with how objects in reality respond to gravity, force, motion, acceleration etc. Of course, a gaming environment may be configured with alternative rules of behavior (e.g., portions of the world could exhibit anti-gravity).

The BSP engine 136 may be configured to generate binary space partitioning (BSP) trees to represent elements of world geometry 125, character geometry 127 and/or tool geometry 129. As is known, a BSP tree is a data structure which provides a recursive, hierarchical subdivision, dividing an n-dimensional space into convex subspaces. In a three-dimensional space, a BSP tree generally contains all of the polygons of a given set of geometry. At any given level of the BSP tree, all of the polygons to the right of a partitioning tree are on one side of a hyper plane division, and all of the polygons to the left of the partitioning are on the other. As is known, BSP trees provide an effective approach for determining whether a given polygon in a set of geometry (e.g., world geometry 125) is visible or occluded by others.

In one embodiment, the BSP engine 138 generates a BSP tree describing the world geometry 125, character geometry 127 and tool geometry 129. Additionally, the resulting BSP trees may characterize each region (i.e., each polygon) of world geometry 125 as has having a painted or thinned state. As noted above, the painted state in a visible polygon has a painted volume rendered opaquely (i.e., visible) and opaque to collisions. That is, the polygon will collide with polygons of other objects (or itself) as determined by the physics engine 136. In contrast, the thinned state in a visible polygon results in a polygon being rendered visibly transparent and transparent to collisions. The amount of transparency may be complete (i.e., a thinned region of geometry may be invisible) or limited to some level of transparency which allows the thinned volume to be observed within the gaming environment to a greater or lesser degree, depending on the level of transparency. Also note, tool geometry 129 representing paint or thinner remains collidable with world geometry, regardless of that geometry being in a painted or thinned state.

Further, the BSP engine may be configured to merge a BSP tree representing the tool geometry 129 with, e.g., the world geometry 125. If the tool geometry 129 represents a painting tool, then the state of some polygons in the world geometry 125 may be updated to have a painted state, i.e., thinned regions of geometry become painted. Conversely, if the tool geometry 129 represents a thinning tool, then painted regions may be converted to a thinned state. In one embodiment, the regions of geometry may be specified as having a painted, thinned, inert or exterior state. As noted, thinning converts the intersection of geometry with a thinning tool into a thinned volume, rendered visibly transparent and transparent to collisions, while painting converts the intersection into a painted volume, rendered opaquely and opaque to collisions. Inert is used for volumes whose state connect be changed, i.e., cannot be thinned (if paint is applied) or painted (if thinner is applied). The following table presents an algebra for determining the resulting state of a region of geometry (as represented by a BSP tree) when that region is intersected with a painting or thinning tool.

TABLE I

Painting and Thinning Algebra

| Environment | Tool | Result |
| --- | --- | --- |
| Paint | @ Paint = | Paint |
| Paint | @ Thinner = | Thinner |
| Thinner | @ Paint = | Paint |
| Thinner | @ Thinner = | Thinner |
| Inert | @ Paint = | Inert |
| Inert | @ Thinner = | Inert |
| Exterior | @ Paint = | Exterior |
| Exterior | @ Thinner = | Exterior |

Note, "exterior" refers to a region of geometry labeled as being outside of a given element of world geometry. Because of the algebra, the world-geometry 125 (or character geometry 127) remains restorative in response to painting and thinning operations. That is, the geometry of an object is unaffected by a painting or thinning operation, but its appearance and collidability for purposes of physics and game play is changed. Thus, thinning a previously painted object or repainting a thinned object restores the painting/thinning state of that geometry without altering its two- or three-dimensional structure. Compare this with an algebra used for constructive solid geometry (CSG):

TABLE II

Constructive Solid Geometry Algebra - Union operation

| Environment | Tool | Result |
| --- | --- | --- |
| Interior | @ Interior = | Interior |
| Interior | @ Exterior = | Interior |
| Exterior | @ Interior = | Interior |
| Exterior | @ Exterior = | Exterior |

Both painting/thinning operations and CSG operations may be used to modify the underlying geometry of an object. However, painting/thinning operations, unlike CSG operations, maintain the original "fully painted" state within the BSP tree, even though the BSP tree and the object's underlying geometry have been modified. In other words, given a fully painted object on which many thinning operations are performed, the fully painted state of the object may be easily restored through painting operations, because the thinning operation does not destroy information about the original, fully painted state.

As shown, the server system 140 includes the same basic hardware elements as the client computers 120. Specifically, the server system 140 includes a processing unit 142 (representative of one or more CPUs and/or GPUs), a memory 144 and storage 143 connected via a bus 141. The server system 140 may be operably connected to the network 160, which generally represents any kind of data communications network. Accordingly, the network 160 may represent both local and wide area networks, including the Internet. In one embodiment, the server system 140 hosts an on-line gaming environment to which one or more of the client computers 120 connect. In this case, server-side gaming software 146 may be located in memory 144 of the server system 140 and cooperates with client-side gaming software (e.g., game program 132) located on the respective client computers 120.

Figure 2A:
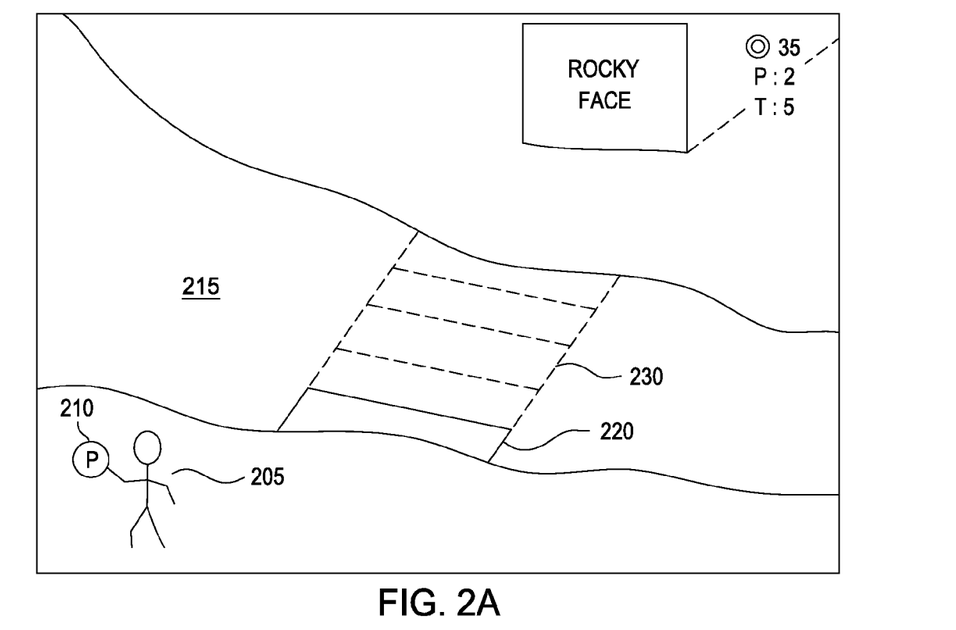
FIGS. 2A-2B illustrate an example of paint material being applied to the geometry of a gaming environment, according to an embodiment of the invention.
Figure 2B:
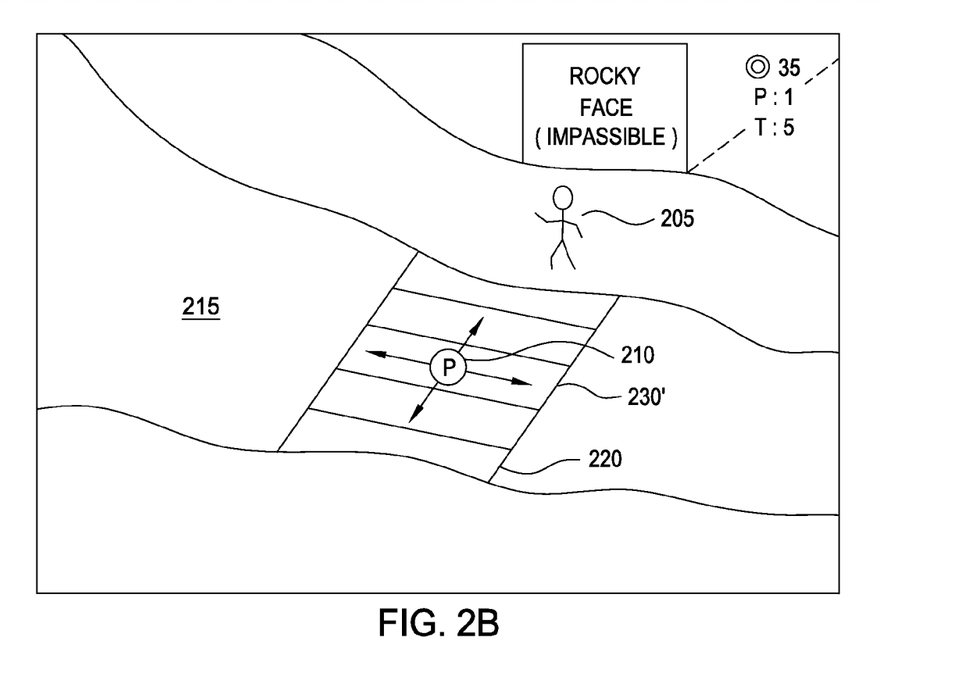

FIGS. 2A-2B illustrate an example of paint material being applied to the geometry of a gaming environment, according to an embodiment of the invention. In this Example, FIG. 2A shows a still-image 200 of a video game where the world geometry includes a chasm 215 and a thinned bridge 230. As shown, an initial plank 220 of the thinned bridge 230 is shown in a painted state. The plank 220 may provide a clue to the user that some of the world geometry is present but in a thinned state. Further, although thinned bridge 230 is shown FIG. 2A as dashed lines, as noted above, material in a thinned state may be fully invisible.

A character 205 is stuck on one side of the chasm 215. The character 205 is shown holding a capsule 210 of painting material. Assume the character 205 throws the capsule 210 at thinned bridge 230, and further, the physics engine is configured to treat the paint material as a liquid. In one embodiment, this may be approximated by determining a location where the capsule 210 hits and merging a tool representing a fixed approximation of the paint (or thinner) "spreading."

Accordingly, when the capsule 210 intersects the bridge 230, the paint material in capsule 210 spreads across the surface of thinned bridge, resulting in sections of the bridge 230 being painted. In one embodiment, to determine what sections of the bridge are painted by the paint material, a BSP tree representing the paint material and a BSP tree representing the thinned bridge 230 are merged, and the state of painted/thinned sections of the bridge geometry are updated. If the paint material did not intersect a sufficient portion of the bridge to allow the character 205 to cross, additional paint material could be applied. This result of applying the paint material to the thinned bridge 230 is shown in FIG. 2B, where painted bridge 230' now allows the character 205 to cross to the other side of the chasm 215.

Figure 3A:
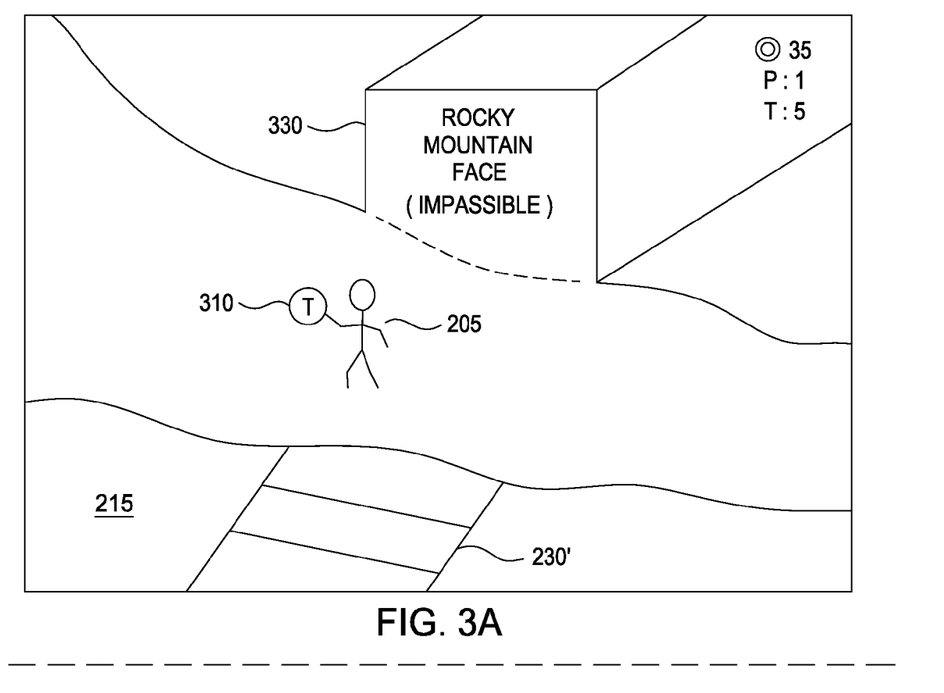
FIGS. 3A-3B illustrate an example of thinner material being applied to the geometry of the gaming environment of FIGS. 2A-2B, according to an embodiment of the invention.
Figure 3B:
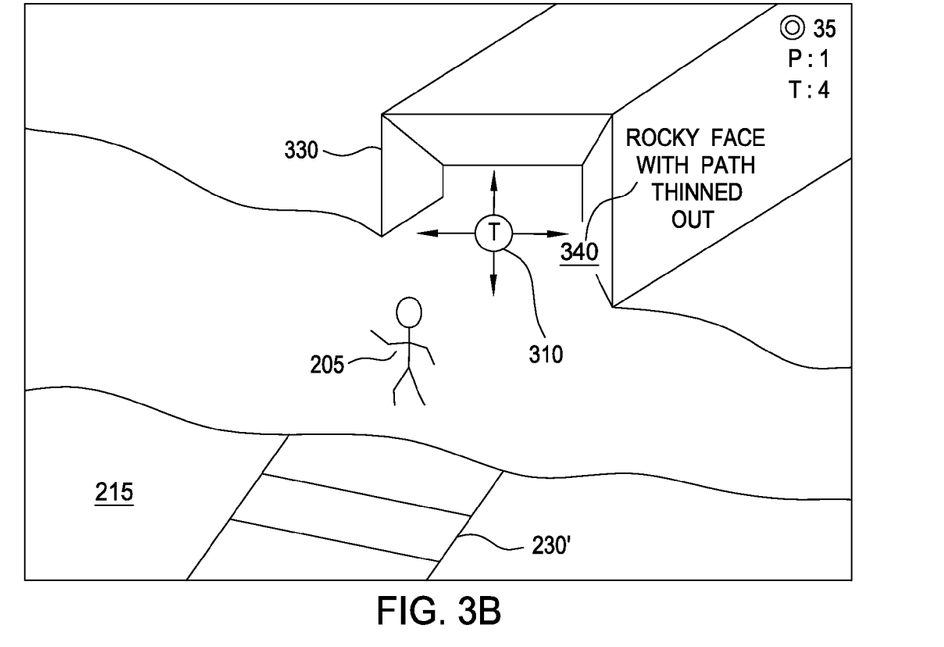

FIGS. 3A-3B illustrate an example of thinner material being applied to some of the geometry of the gaming environment of FIGS. 2A-2B, according to an embodiment of the invention. In this example, FIG. 3A shows a still-image 300 of the video game after the character 205 has crossed the chasm 215 (on painted bridge 230') and reached a rocky mountain face 330. As shown, the rocky mountain face 330 is impassable. However, the character 205 is shown holding a capsule 310 of thinning material. Assume the character 205 throws the capsule 310 at rocky mountain face 330, and further, the physics engine is configured to treat the thinning material as a liquid. Accordingly, when the capsule 310 intersects the rocky mountain face 330, the thinning material in capsule 310 spreads across the surface of rocky mountain face 330, resulting in sections being thinned. In one embodiment, to determine what regions of the world geometry are "thinned" by the thin material, as with the paint material, a BSP tree representing the thinning material and a BSP tree representing the rocky mountain face 330 are merged, and the state of painted/ thinned sections of the rocky mountain face 330 are updated. If the paint material did not intersect a sufficient area of rocky mountain face 330 to reveal the passage behind the rocky mountain face 330, additional thinning material could be applied.

As noted, in a thinned state, the geometry of rocky mountain face 330 is treated as transparent to collisions and may be rendered in a semi-visible state or not at all. This result of applying the thinning material to the rocky mountain face 330 is shown in FIG. 3B, where open passage 340 is now visible, allowing the character 205 to enter a cave behind the rocky mountain face 330. Of course, the examples of FIGS. 2A-2B and 3A-3B represent just one example of how the painting and thinning mechanic may be used within a video game and any number of in-game scenarios for using the painting and thinning mechanic to alter the appearance and collidability of in game geometry is contemplated. For example, the geometrical regions need not be represented by vertices. Other representations are possible (e.g., a pure hyperplane/subhyperplane approach). Similarly, an in game character may be provided with access to the paint or thinner material using a variety of mechanisms in addition to the capsule approach described for paint capsule 210 and thinner capsule 310. Further, the examples of FIGS. 2A-2B and 3A-3B provide an example where the user controlling the in-game character controls the application of paint or thinner to the world. Of course, other variations are possible. That is, elements of the world geometry itself may provide the paint or thinner material. For example, a waterfall could be made of thinner material. In such a case, if a cave is accessible only by traversing under the waterfall, objects held by the in-game character that are susceptible to be thinned (based on the paining or thinning state of their object geometry) would be thinned when the in-game character traverses under the waterfall. Conversely, the waterfall could be paint material. Assume an in-game character is attacked by game-controlled characters throwing thinner capsules at the in-game character, resulting in a thinned in-game character unable to interact with the world geometry of the game. In such a case, the paint waterfall would allow the user to reanimate the in-game character.

Figure 4:
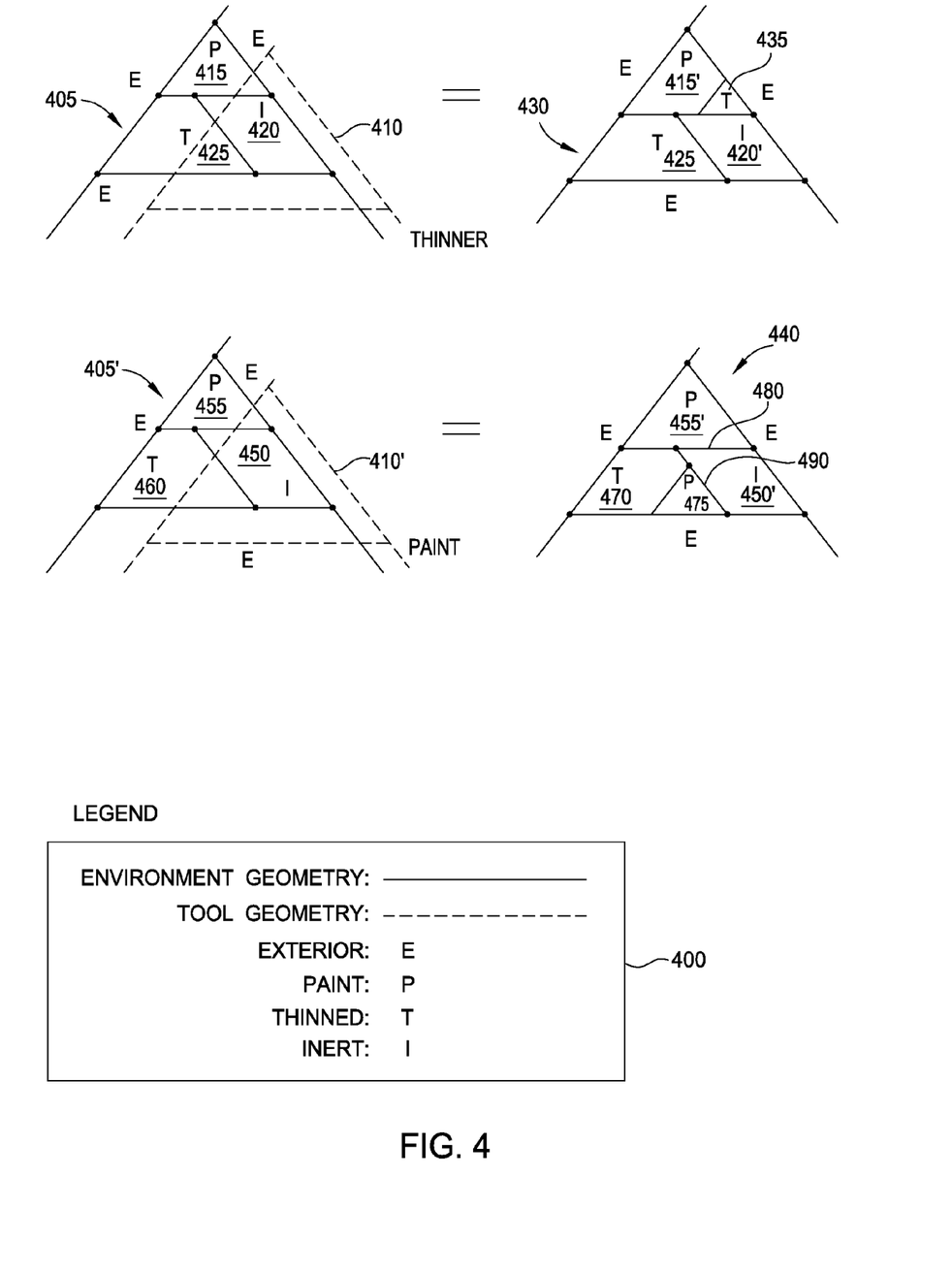
FIG. 4 illustrates an example of two two-dimensional binary space partitioning (BSP) trees being merged according to an algebra describing the results of intersecting paint (or thinner) with world geometry, according to an embodiment of the invention.

FIG. 4 illustrates an example of a section of two-dimensional geometry to which a paint and thinner tool is applied based on an algebra describing the results of intersecting paint (or thinner) with the geometry, according to one embodiment of the invention. In FIG. 4, the geometry is represented using a set of regions, defined by a set of vertices Additionally, each region in the geometry is associated with a painting/thinning state of exterior, paint, thinned, or inert, according to the labels shown in a legend 400.

Illustratively, the geometry 405 includes a painted region 415, an inert region 420 and a thinned region 425, bounded on each side by an exterior region. FIG. 4 shows also shows the geometry of a thinning tool 410 applied to geometry 405. In particular, the thinning tool 410 intersects a portion of each of the painted region 415, the inert region 420 and the thinned region 425. The results of applying the thinning tool 410 to each region are shown in geometry 430. The thinned region 425' and the inert region 420' are unchanged by the application of thinner. However, the painted region 415 is now divided into painted region 415' and thinned region 435. That is, the application of the thinning tool 410 results in a new thinned region 435 being introduced to the geometry 430.

FIG. 4 also illustrates an example of a painting tool 410' being applied to a set of geometry 405'. Like, the geometry 405, the geometry 405' includes a painted region 455, an inert region 450 and a thinned region 460, bounded on each side by an exterior region. And the painting tool 410' intersects a portion of each of the painted region 455, the inert region 450 and the thinned region 460. The results of applying the painting tool 410' to each of these regions are shown in geometry 440. The painted region 455' and the inert region 450' are unchanged by the application of paint to the geometry 405'. However, the thinned region 460 is now divided into thinned region 470 and painted region 475. That is, the application of the paint tool 410' results in a new painted region 475 being introduced to the geometry 440.

Figure 5:
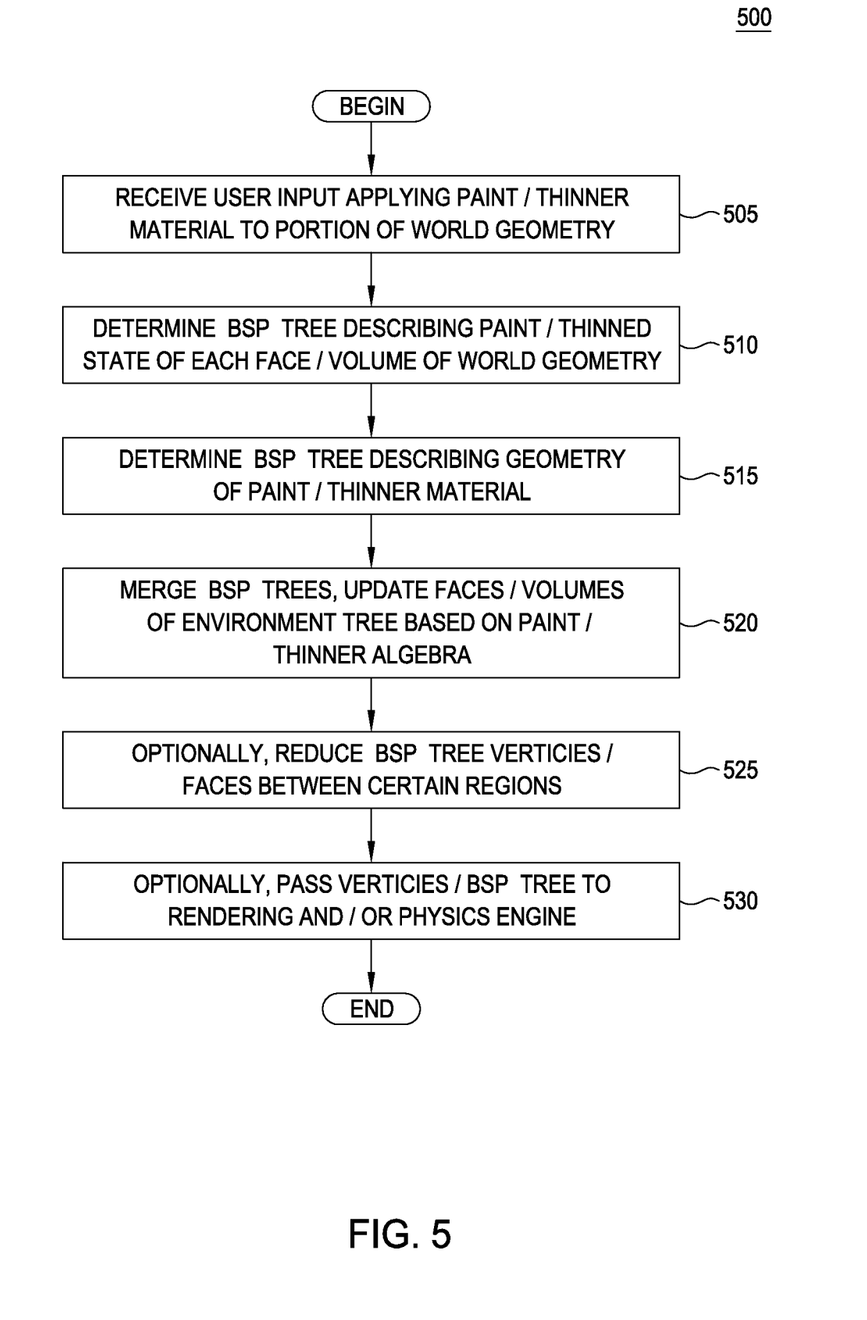
FIG. 5 illustrates a method for providing a paint/thinner mechanic, according to an embodiment of the invention.

FIG. 5 illustrates a method 500 for providing a paint/thinner game mechanic, according to an embodiment of the invention. As shown, the method 500 begins at step 505, where a game engine receives user input resulting in paint or thinner material being applied to some portion of world (or character) geometry. For example, as described above, a game may be configured so as to provide users with access to paint or thinner capsules, filled with material treated as a liquid by a physics engine. In such a case, when the capsule impacts elements of the world geometry and bursts, the liquid paint or thinner material spreads across the surface of the geometry.

At step 510, the game engine may determine a binary space partitioning (BSP) tree describing a paint/thinned state of each face or volume of the world geometry to which the paint/thinner material was applied at step 505. As noted above, in one embodiment, each region of geometry on the world (or character) geometry may have an associated state of painted, thinned, inert or exterior state. At step 515, the game engine may generate a BSP tree describing the geometry of the paint/thinner material being applied to the world geometry. At step 520, the game engine may merge the BSP trees determined at steps 510 and 515. While a variety of techniques for merging BSP trees may be used, one approach is described in "Merging BSP Trees Yields Polyhedral Set Operations," by Bruce Naylor published at pages 115-124 in the *International Conference on Computer Graphics and Interactive Techniques Proceedings of the 17th annual Conference on Computer Graphics and Interactive Techniques*, and which is hereby incorporated by reference in its entirety.

In one embodiment, the merged tree is used to determine an updated state for the faces of the world geometry. For example, Table I, above, shows algebra for determining a resultant state for the faces of the world geometry which intersects with the paint (or thinner) material, based on an initial state and the application of either paint or thinner material.

Optionally, at step 525, the gaming engine may simplify the merged BSP tree representing the world geometry. As noted above, the merged BSP tree represents a set of regions of geometry where each region may have a painted, thinned, inert or exterior state, and the boundary of each region may be derived by a set of vertices. Further, the geometry, as represented in a BSP tree may be used for certain rendering (or physics) operations. As noted, e.g., BSP trees provide an effective approach for determining whether a given polygon in a set of world geometry is visible or occluded by others. However, not all of the different regions in the merged BSP tree are needed for rendering. For example, consider the geometry 440 shown in FIG. 4, which includes a boundary 480 and a boundary 490. The boundary 480 and 490 each separate a painted region and an inert region. As both the properties of an inert region and a painted region are the same (for purposes of rendering), the three distinct regions 450', 455' and 475 may be collapsed into a single region. That is, as both painted regions and inert regions are painted and opaque to collisions, they need not be distinguished from one another when the geometry is passed to a rendering (or physics)

engine. At step 530, the vertices of the world geometry are passed to a rendering and/or physics engine, resulting in images being rendered, with geometry having the painted or thinned state.

Advantageously, embodiments described above may be used to provide a painting and thinning mechanic within a computer-generated environment (e.g., in a video game). The painting and thinning mechanic allows geometry within the computer-generated environment to be "painted" or "thinned." More specifically, painting and thinning refers to a game mechanic that involves making parts of the game world visibly and collidably transparent (thinning) or visibly and collidably opaque (painting). Users may interact directly with the results of a painting or thinning operation, e.g., thinned sections of the world could be passed through, while painted sections could be hung on, landed on, traversed, etc. An in-game character could access units of a "painting" or "thinning" substance and throw, launch or otherwise release it into the computer-generated environment, resulting in the paint (or thinner) material intersecting with elements of the world geometry. In one embodiment, the painting/thinning mechanic may be achieved using binary space partitioning (BSP) trees.

The aforementioned operations to be performed by a gaming program provides a platform gaming experience that advantageously provides an additional method of direct interaction with gaming elements with an improved user experience. While the foregoing is directed to embodiments of the present invention, other and further embodiments of the invention may be devised without departing from the basic scope thereof, and the scope thereof is determined by the claims that follow.

What is claimed is:

1. A computer-implemented method for executing a video game, comprising:
   receiving an input indicating to apply a liquid paint or a liquid thinner material to a first set of geometry in the video game, wherein the liquid paint or the liquid thinner material is rendered as a capsule held by a game character and wherein the input directs the game character to throw the capsule at the first set of geometry;
   determining a burst location on the first set of geometry where the capsule impacts the first set of geometry;
   determining a second set of geometry corresponding to a spreading effect of the liquid paint or the liquid thinner material from the burst location to an area of the first set of geometry, wherein the spreading effect of the liquid paint or the liquid thinner material is determined by a physics engine;
   merging, by operation of one or more processors, a first binary space partitioning (BSP) tree with a second BSP tree to create a merged BSP tree, wherein the first BSP tree represents the first set of geometry, wherein the second BSP tree represents the second set of geometry, of the liquid paint or the liquid thinner material, wherein one or more elements of geometry represented in the first BSP tree are associated with a respective paint/thinning state, and wherein the merged BSP tree represents a merged set of geometry created from the first and second sets of geometry;
   updating, based on the spreading effect determined by the physics engine of the liquid paint or the liquid thinner material on the area of the first set of geometry, a paint/thinning state associated with a respective one or more elements of the merged set of geometry in the merged BSP tree; and
   rendering the respective one or more elements of the merged set of geometry opaque or transparent based on the paint/thinning states of the respective one or more elements in the merged set of geometry.

2. The method of claim 1, further comprising, generating the first BSP tree from the set of geometry in the video game.

3. The method of claim 1, further comprising generating the second BSP tree representing the liquid paint or the liquid thinner material.

4. The method of claim 1, wherein the paint/thinning state associated with the respective one or more elements of the merged set of geometry comprises one of a painted, thinned, inert, or exterior state.

5. The method of claim 4, wherein the input indicates to apply paint material to elements in the first set of geometry which intersect the second set of geometry, and wherein updating, in the merged BSP tree, the paint/thinning state associated with the respective one or more elements of the merged set of geometry comprises updating elements which intersect the second set of geometry having a thinned state with a painted state.

6. The method of claim 4, wherein the input indicates to apply thinner material to elements in the first set of geometry which intersect the second set of geometry, and wherein updating, in the merged BSP tree, the paint/thinning state associated with the respective one or more elements of the merged set of geometry comprises updating elements which intersect the second set of geometry having a painted state with a thinned state.

7. The method of claim 4, wherein elements in the merged set of geometry having the thinned state are visibly and collidably transparent within the video game, and wherein elements in the merged set of geometry having the painted state are visibly and collidably opaque within the video game.

8. The method of claim 1, further comprising, passing the merged BSP tree to a rendering engine.

9. The method of claim 8, further comprising, prior to passing the merged BSP tree to the rendering engine, removing one or more faces from the merged BSP tree.

10. A non-transitory computer-readable storage medium comprising a program product which, when executed, is configured to perform an operation for executing a video game, the operation comprising:
    receiving an input indicating to apply a liquid paint or a liquid thinner material to a first set of geometry in the video game, wherein the liquid paint or the liquid thinner material is rendered as a capsule held by a game character and wherein the input directs the game character to throw the capsule at the first set of geometry;
    determining a burst location on the first set of geometry where the capsule impacts the first set of geometry;
    determining a second set of geometry corresponding to a spreading effect of the liquid paint or the liquid thinner material from the burst location to an area of the first set of geometry, wherein the spreading effect of the liquid paint or the liquid thinner material is determined by a physics engine;
    merging, by operation of one or more processors, a first binary space partitioning (BSP) tree with a second BSP tree to create a merged BSP tree, wherein the first BSP tree represents the first set of geometry, wherein the second BSP tree represents the second set of geometry, of the liquid paint or the liquid thinner material, wherein one or more elements of geometry represented in the first BSP tree are associated with a respective paint/ thinning state, and wherein the merged BSP tree represents a merged set of geometry created from the first and second sets of geometry;

updating, based on the spreading effect determined by the physics engine of the liquid paint or the liquid thinner material on the area of the first set of geometry, a paint/thinning state associated with a respective one or more elements of the merged set of geometry in the merged BSP tree; and rendering the respective one or more elements of the merged set of geometry opaque or transparent based on the paint/thinning states of the respective one or more elements in the merged set of geometry.

11. The non-transitory computer-readable storage medium of claim 10, wherein the operation further comprises, generating the first BSP tree from the set of geometry in the video game.

12. The non-transitory computer-readable storage medium of claim 10, wherein the operation further comprises, generating the second BSP tree representing the liquid paint or the liquid thinner material.

13. The non-transitory computer-readable storage medium of claim 10, wherein the paint/thinning state associated with the respective one or more elements of the merged set of geometry comprises one of a painted, thinned, inert, or exterior state.

14. The non-transitory computer-readable storage medium of claim 13, wherein the input indicates to apply paint material to elements in the first set of geometry which intersect the second set of geometry, and wherein updating, in the merged BSP tree, the paint/thinning state associated with the respective one or more elements of the merged set of geometry comprises updating elements which intersect the second set of geometry having a thinned state with a painted state.

15. The non-transitory computer-readable storage medium of claim 13, wherein the input indicates to apply thinner material to elements in the first set of geometry which intersect the second set of geometry, and wherein updating, in the merged BSP tree, the paint/thinning state associated with the respective one or more elements of the merged set of geometry comprises updating elements which intersect the second set of geometry having a painted state with a thinned state.

16. The non-transitory computer-readable storage medium of claim 13, wherein elements in the merged set of geometry having the thinned state are visibly and collidably transparent within the video game, and wherein elements in the merged set of geometry having the painted state are visibly and collidably opaque within the video game.

17. The non-transitory computer-readable storage medium of claim 10, wherein the operation further comprises, passing the merged BSP tree to a rendering engine.

18. The non-transitory computer-readable storage medium of claim 17, wherein the operation further comprises, prior to passing the merged BSP tree to the rendering engine, removing one or more faces from the merged BSP tree.

19. A system, comprising:
a memory device storing an application program; and
a processor which, when executing the application program is configured to perform an operation, comprising:
receiving an input indicating to apply a liquid paint or a liquid thinner material to a first set of geometry in the video game, wherein the liquid paint or the liquid thinner material is rendered as a capsule held by a game character and wherein the input directs the game character to throw the capsule at the first set of geometry;
determining a burst location on the first set of geometry where the capsule impacts the first set of geometry, determining a second set of geometry corresponding to a spreading effect of the liquid paint or the liquid thinner material from the burst location to an area of the first set of geometry, wherein the spreading effect of the liquid paint or the liquid thinner material is determined by a physics engine, merging, by operation of one or more processors, a first binary space partitioning (BSP) tree with a second BSP tree to create a merged BSP tree, wherein the first BSP tree represents the first set of geometry, wherein the second BSP tree represents the second set of geometry, of the liquid paint or the liquid thinner material, wherein one or more elements of geometry represented in the first BSP tree are associated with a respective paint/thinning state, and wherein the merged BSP tree represents a merged set of geometry created from the first and second sets of geometry, updating, based on the spreading effect determined by the physics engine of the liquid paint or the liquid thinner material on the area of the first set of geometry, a paint/thinning state associated with a respective one or more elements of the merged set of geometry in the merged BSP tree, and rendering the respective one or more elements of the merged set of geometry opaque or transparent based on the paint/thinning states of the respective one or more elements in the merged set of geometry.

20. The system of claim 19, wherein the operation further comprises, generating the first BSP tree from the set of geometry in the video game.

21. The system of claim 19, wherein the operation further comprises, generating the second BSP tree representing the liquid paint or the liquid thinner material.

22. The system of claim 19, wherein the paint/thinning state associated with the respective one or more elements of the merged set of geometry comprises one of a painted, thinned, inert, or exterior state.

23. The system of claim 22, wherein the input indicates to apply paint material to elements in the first set of geometry which intersect the second set of geometry, and wherein updating, in the merged BSP tree, the paint/thinning state associated with the respective one or more elements of the merged set of geometry comprises updating elements which intersect the second set of geometry having a thinned state with a painted state.

24. The system of claim 22, wherein the input indicates to apply thinner material to elements in the first set of geometry which intersect the second set of geometry, and wherein updating, in the merged BSP tree, the paint/thinning state associated with the respective one or more elements of the merged set of geometry comprises updating elements which intersect the second set of geometry having a painted state with a thinned state.

25. The system of claim 22, wherein elements in the merged set of geometry having the thinned state are visibly and collidably transparent within the video game, and wherein elements in the merged set of geometry having the painted state are visibly and collidably opaque within the video game.

26. The system of claim 19, wherein the operation further comprises, passing the merged BSP tree to a rendering engine.

27. The system of claim 26, wherein the operation further comprises, prior to passing the merged BSP tree to the rendering engine, removing one or more faces from the merged BSP tree.

* * * * *